United States Patent
Gholami et al.

(12) 
(10) Patent No.: US 6,182,230 B1
(45) Date of Patent: Jan. 30, 2001

(54) ACTIVE ACCELERATED DISCHARGE OF A CAPACITIVE SYSTEM

(75) Inventors: Ghadir Robert Gholami; Khuong Huu Pham, both of Austin, TX (US)

(73) Assignee: International Business Machines Corporation, Armonk, NY (US)

(*) Notice: Under 35 U.S.C. 154(b), the term of this patent shall be extended for 0 days.

(21) Appl. No.: 09/165,959

(22) Filed: Oct. 2, 1998

(51) Int. Cl.[7] .................................................. G06F 1/26
(52) U.S. Cl. ............................................ 713/300; 713/340
(58) Field of Search ................................... 713/300, 340; 714/14; 322/99; 361/15, 18, 92; 324/600; 323/364, 370; 340/635; 363/79, 89, 127; 348/730; 327/51

(56) References Cited

U.S. PATENT DOCUMENTS

| | | |
|---|---|---|
| 3,973,169 * | 8/1976 | Titus . |
| 4,193,023 * | 3/1980 | Buck et al. . |
| 4,897,597 * | 1/1990 | Whitener . |
| 5,636,288 * | 6/1997 | Bonneville et al. . |
| 5,705,979 * | 1/1998 | Fierro et al. . |

* cited by examiner

Primary Examiner—Gopal C. Ray
(74) Attorney, Agent, or Firm—Joseph P. Lally; Leslie A. Van Leeuwen

(57) ABSTRACT

An active circuit for rapidly discharging stored energy in a capacitive system. The circuit is comprised of a variable impedance circuit, a voltage detector, and a time delay circuit. The variable impedance circuit includes a variable impedance output path configured to be connected between a Vcc bus of the capacitive system and ground. The voltage detector circuit includes an input coupled to the Vcc bus and an output connected to an input of the variable impedance circuit. The voltage detector circuit is configured to maintain the variable impedance output path in a high impedance condition while the Vcc voltage remains above a predetermined minimum value. The time delay circuit is coupled to the input of the variable impedance circuit and configured to maintain the variable impedance output path in a low impedance condition for a duration after the voltage of the Vcc bus drops below the predetermined minimum.

20 Claims, 3 Drawing Sheets

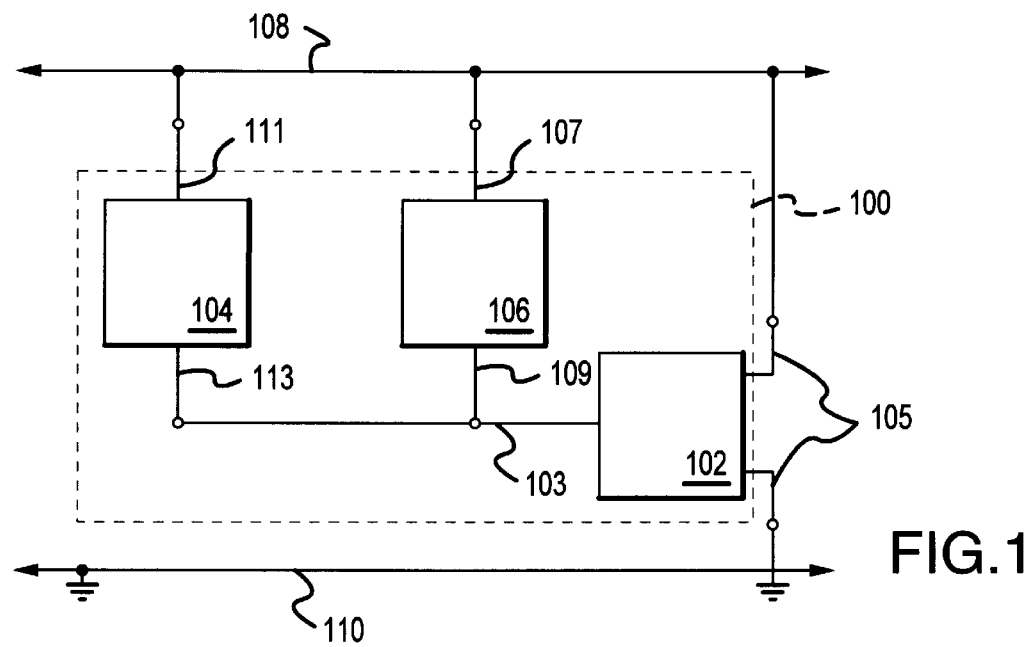
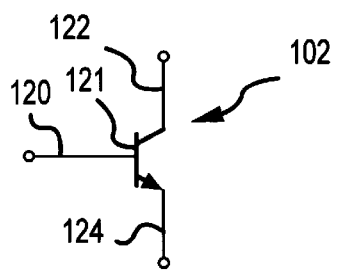
FIG.2A
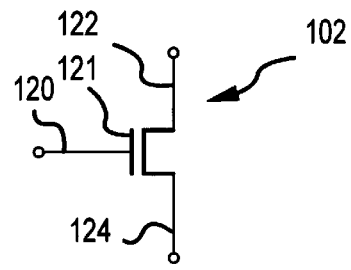
FIG.2B
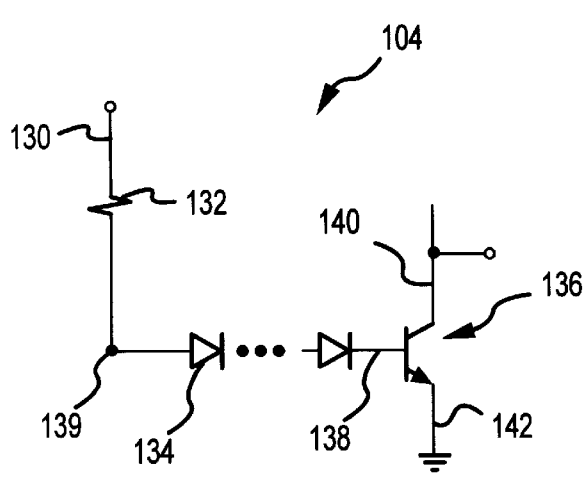
FIG.3A
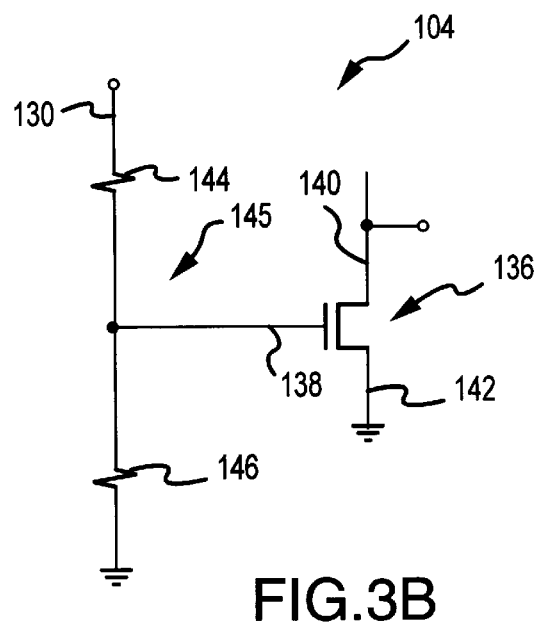
FIG.3B

ACTIVE ACCELERATED DISCHARGE OF A CAPACITIVE SYSTEM

BACKGROUND

1. Field of the Present Invention

The present invention generally relates to capacitive discharge in an electronic system and more specifically to a circuit for rapidly eliminating charged stored in a computer system during a temporary loss of system power.

2. History of Related Art

Microprocessor based computing systems are widely used for personal, business, scientific, and government applications. The price-to-performance ratio of these machines has improved so dramatically in the 1990's that microprocessor based computers are now used for tasks previously reserved for workstations and mainframe computers such as performance demanding applications and large network controllers. The increased expectations placed on these machines by consumers have forced manufacturers of personal computers and other similar microprocessor based machines to devote increased attention to reliability issues. Consumers who rely on microprocessor based machines to run entire networks, maintain financial information including payroll, accounts receivable, accounts payable, and other critical functions require essentially zero down time.

Many modem computer systems include power management modules designed to minimize and monitor the power consumed by the computer system. Power management modules may include functionality designed to place system components in low power or standby mode if a particular device experiences no activity for a specified duration. While these modules are highly desirable to reduce the tremendous power consumed by high performance computer systems, the power management system adds complexity to the computer system. In addition to power management modules, typical computer systems include a variety of subsystems in addition to the core circuitry comprised of the microprocessor and its support devices. Each of these core systems and sub-systems includes thousand of logic gates interconnected by a network of interconnect structures. Reliable operation requires that each of the systems and their component pieces be initiated or powered up in a known state. Once a known state has been achieved, the computer system inputs and outputs may then be manipulated and monitored to transition the computer system from one known state to a next known state in a predictable manner. The predictability of the computer system is an essential feature of any state machine and is obviously a cornerstone of reliable operation.

Predictability can be lost, however, if the computer system is operated before achieving a known or initial state. Computer systems may be inadvertently and undesirably forced into an unknown or indeterminate state by a variety of mechanisms. One not too uncommon scenario that can wreak havoc with the various modules of a computer system occurs when the power supply voltage is briefly or temporarily disrupted. Line disturbances and other relatively brief interruptions in the steady supply of power to a computer system can force the system into an unknown state by initiating a power up sequence before the system has achieved a suitable power off condition. Due to the sometimes large system or bulk capacitance associated with computer systems, energy or charge stored in the system may require a relatively long time to fully achieve a zero power or "off" state. If a comparatively brief line disturbance occurs, it is entirely possible that a power up sequence is initiated before the computer has reached a steady state condition. Under these circumstances, the computer system may be in any of an essentially infinite number of states when the power up sequence is initiated. The state of the computer system that results when a power up sequence is initiated under such circumstances can be unpredictable. This unpredictability presents a serious reliability concern to users and makers of computer systems, especially in view of the inevitability of power outages and external line disturbances, which are almost universally beyond the control of the computer user and manufacturer alike. Accordingly, it would be highly desirable to provide a practical solution to assist computer systems in achieving a zero power condition whenever a significant line disturbance is encountered.

SUMMARY OF THE INVENTION

The problem identified above is in large part addressed by a circuit designed to provide a low impedance path from Vcc to ground that is activated upon sensing that the Vcc signal has dropped below a specified voltage. During normal operation, the circuit of the present invention maintains an essentially open circuit between Vcc and ground. When the circuit detects an unacceptable drop in Vcc, it drives an output stage coupled between a Vcc bus and ground to a low impedance condition to rapidly dissipate stored charged in the various components of the system. Whether integrated into the system power supply or built into the system motherboard, the present invention assures that system components will settle to 0 V quickly after a power outage thereby minimizing the risk that the system will power up while one or more components are in an indeterminate state.

Broadly speaking, the present invention contemplates an active circuit for rapidly discharging stored energy in a capacitive system. The circuit is comprised of a variable impedance circuit, a voltage detector, and a time delay circuit. The variable impedance circuit includes a variable impedance output path configured to be connected between a Vcc bus of the capacitive system and ground. The voltage detector circuit includes an input coupled to the Vcc bus and an output connected to an input of the variable impedance circuit. The voltage detector circuit is configured to maintain the variable impedance output path in a high impedance condition while the Vcc voltage remains above a predetermined minimum value. The time delay circuit is coupled to the input of the variable impedance circuit and configured to maintain the variable impedance output path in a low impedance condition for a duration after the voltage of the Vcc bus drops below the predetermined minimum.

In one embodiment of the invention, the variable impedance circuit comprises a first transistor including an input terminal and first and second output terminals. In this embodiment, the input terminal of the first transistor is connected to the input of the variable impedance circuit. The first and second output terminals of the first transistor are connected to the Vcc bus and ground respectively. The variable impedance output path comprises a path between the first terminal and the second output terminals. The first transistor is preferably a bipolar transistor, and still more preferably an npn bipolar transistor, in which the transistor base terminal serves as the input terminal, while the emitter and collector terminals serve as the first and second output terminals respectively of the first transistor. In the npn embodiment, the variable impedance output path is maintained in the high impedance condition unless a base-emitter junction of the transistor is forward biased. In this embodiment, the output of the voltage detector circuit prevents the base-emitter junction from becoming forward biased while the voltage of the Vcc bus remains above the predetermined minimum value.

In a presently preferred embodiment, the voltage detector circuit includes a second transistor and a level shifting circuit. The level shifting circuit is tied to the Vcc bus and connected in series between the Vcc bus and an input terminal of the second transistor. The second transistor is preferably a bipolar transistor arranged with the base terminal as the input terminal and the collector terminal as the output of the voltage detector circuit. In this embodiment, the level shifting circuit is preferably comprised of a first resistor tied to Vcc and connected in series to one or more diodes. In an alternative embodiment, the second transistor is a MOS transistor configured with the gate terminal as the input terminal of the second transistor and the drain and source terminals as the output terminals. In this embodiment, the level shifting circuit comprises a voltage divider circuit including a first resistor connected between Vcc and the input terminal of the level shifting circuit and a voltage divider resistor connected between the input terminal of the level shifting circuit and ground.

The time delay circuit preferably comprises second and third resistors and a capacitor. The second resistor is suitably connected between the Vcc bus and a delay node of the time delay circuit. The third resistor is connected between the delay node and the input of the variable impedance circuit. The capacitor is preferably connected between the delay node and ground. In an embodiment useful in a variety of applications, a time constant associated with discharging the capacitor is in excess of approximately 2 ms. In one such embodiment, the capacitance of the capacitor is preferably in the range of approximately 100 to 1000 $\mu$F.

The present invention still further comprises a computer system that includes, a chassis, a power supply unit mounted to the chassis, a printed circuit card, and an active discharge circuit. The power supply unit includes an input configured to receive an externally supplied line voltage and an output configured to produce a Vcc signal when the line voltage is present at the power supply unit input. The printed circuit card includes a plurality of integrated circuits connected to a printed circuit board. Each of the integrated circuits is connected to a Vcc bus and a ground bus. The Vcc bus is configured to receive the Vcc signal produced by the power supply unit. The active discharge circuit includes a variable impedance circuit, a voltage detector circuit, and a stored energy circuit. The variable impedance circuit includes a variable impedance output path configured to be connected between the Vcc bus and ground. The voltage detector circuit includes an input terminal coupled to the Vcc bus and an output terminal connected to an input of the variable impedance circuit. The voltage detector circuit is configured to maintain the variable impedance output path in a high impedance condition while the Vcc bus remains above a predetermined minimum voltage. The stored energy circuit is coupled to the input of the variable impedance circuit and configured to maintain the variable impedance output path in a low impedance condition for a duration after the Vcc bus drops below the predetermined minimum voltage. Preferably, the printed circuit card is the mother board of the system. In one embodiment, the active discharge circuit is integrated within the power supply unit, while, in an alternative embodiment, the active discharge circuit is configured in the mother board.

The present invention still further contemplates a power supply unit. The unit is designed for use in a computer system and includes an input port configured to receive an externally supplied line voltage such as the 120 V 60 Hz AC voltage found almost universally in the United States. The power supply further includes an output port configured to be coupled to a Vcc bus of the system. The power supply unit is configured to produce a Vcc signal at the output port when the line voltage is present at the input port. Typically, the Vcc signal is a DC voltage in the range of approximately 3 to 12 V. The power supply of the present invention further includes an active discharge circuit including a variable impedance circuit, a voltage detector circuit and a time delay circuit. The variable impedance circuit includes a variable impedance output path coupled across the output port. The voltage detector circuit includes an input configured to receive the Vcc signal and an output connected to an input of the variable impedance circuit, wherein the voltage detector circuit is configured to maintain the variable impedance output path in a high impedance condition while the Vcc signal remains above a predetermined minimum voltage. The stored energy circuit is coupled to the input of the variable impedance circuit and configured to maintain the variable impedance output path in a low impedance condition for a duration after the Vcc signal drops below the predetermined minimum voltage. The preferred embodiment of the power supply is configured to receive a 120V AC signal at the input port and produce a DC signal with a nominal value in the range of approximately 5V. In an embodiment of the power supply for use with low power systems, the power supply is configured to produced a DC signal with a nominal value in the range of approximately 3.3V.

BRIEF DESCRIPTION OF THE DRAWINGS

Other objects and advantages of the invention will become apparent upon reading the following detailed description and upon reference to the accompanying drawings in which:

FIG. 1 is a block diagram of an active discharge circuit according to the present invention;

FIGS. 2A and 2B are alternative circuit depictions of the variable impedance circuit of the active discharge circuit of FIG. 1;

FIGS. 3A and 3B are alternative circuit embodiments of the voltage detector circuit for use in the active discharge circuit of FIG. 1;

Figure 4:
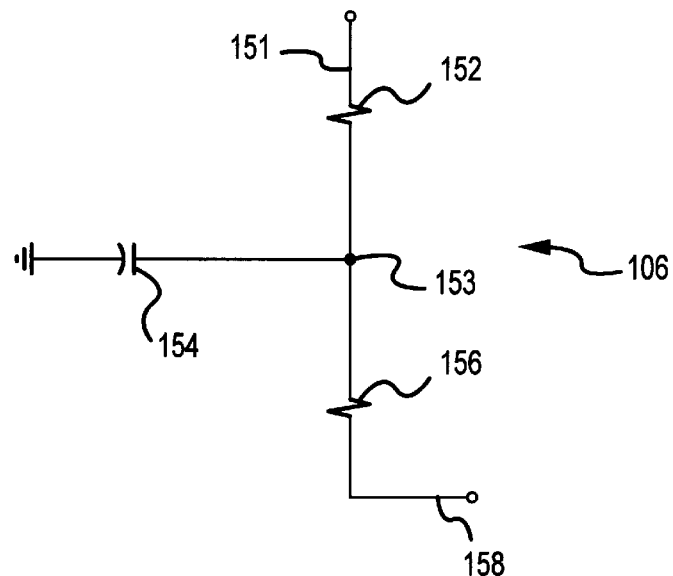
FIG. 4 is a circuit diagram of a time delay circuit according to the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 is a block depiction of an active discharge circuit 100 according to the present invention for use in discharging stored energy in a capacitive electronic system such as a computer. Discharge circuit 100 includes a variable impedance circuit 102, a voltage detector circuit 104, and a time delay circuit 106. Variable impedance circuit 102 includes an input terminal 103 and an variable impedance output path 105. Output path 105 is configured to be coupled between a Vcc power supply bus 108 and a ground bus 110 of the associated electronic system. Voltage detector circuit 104 includes an input terminal 111 that is configured to be connected to Vcc bus 108 and an output terminal 113 that is connected to input terminal 103 of variable impedance circuit 102. Voltage detector circuit 104 is designed to maintain variable impedance output path 105 in a high impedance condition while the voltage signal of Vcc bus 108 remains above a specified minimum. The time delay circuit 106 includes an input terminal 107 configured to be coupled to Vcc bus 108 and an output terminal 109 connected to input terminal 103 of variable impedance circuit 102. Time delay circuit 106 is designed to store energy sufficient to force and maintain variable impedance output path 105 in a low impedance condition for a specified duration after the voltage on Vcc bus 108 drops below the specified minimum.

In the manner described above, variable impedance output path 105 is maintained in a high impedance condition as long as the Vcc voltage remains within specification. If the specified minimum is set appropriately, it can be safely assumed that a power outage or line disturbance has occurred if the Vcc voltage falls below the specified minimum. Under these circumstances, active discharge circuit 100 generates a low impedance path from Vcc to ground through which stored charge in the system can be rapidly discharged. Rapid dissipation of stored charge is highly desirable because of the possibility that the power outage or line disturbance that created the Vcc voltage drop will only last a short duration. If the system charge is not eliminated before the power supply is restored, the system may power up while certain modules or devices within the system are in an indeterminate state, possibly resulting in unpredictable system behavior. To minimize this possibility, the present invention contemplates an effective means of rapidly discharging the system upon detecting a power failure condition.

Turning now to FIGS. 2A and 2B, alternative embodiments of variable impedance circuit 102 are presented. In FIG. 2A, variable impedance circuit 102 is comprised of a first transistor 121 fabricated as an npn bipolar transistor in which the base terminal serves as the input terminal 120 and the collector terminal 122 and emitter terminal 124 serve as the output terminals of first transistor 121. It will be appreciated by those familiar with transistor operation that the impedance of the collector-emitter path varies depending upon the state of the base-emitter junction. If the base-emitter junction is forward biased with a sufficient base current, the collector-emitter impedance is dramatically decreased. Conversely, the collector-emitter impedance dramatically increases if base-emitter junction is taken out of a forward bias condition. Thus, the path from collector terminal 122 to emitter terminal 124 is the variable impedance output path 105 shown in FIG. 1 with the impedance of the path controlled by the state of the base-emitter junction of first transistor 121. Typically, the npn base-emitter voltage is approximately 0.6 V when the junction is forward biased with a current sufficient to generate a significant collector current. It is therefore necessary to maintain input terminal 120 of first transistor 121 at a voltage of less than approximately 0.6 V to maintain a high impedance condition between Vcc bus 108 and ground bus 110 of the electronic system.

Turning briefly to FIG. 2B, an alternative embodiment of variable impedance circuit 102 is shown incorporating MOS technology to achieve the first transistor 121. In this embodiment, input terminal 103 of variable impedance circuit 102 is connected to the gate terminal 120 of an n-channel enhancement MOS transistor, which serves as first transistor 121 while the drain terminal 122 and source terminal 124 serve as the first and second output terminals respectively. As is well known, the output impedance of an MOS transistor with its source grounded and its gate terminal serving as the input is greatly affected by the value of the gate voltage. If a voltage in excess of the threshold voltage (typically in the range of approximately 0.7 V) is maintained at the gate terminal of an MOS transistor, a low impedance channel is produced at the silicon-oxide interface between the source and drain terminals 122 and 124. If the gate voltage (with respect to the source terminal) is reduced to less than the threshold voltage, the surface charge dissipates leaving behind a high impedance and essentially open circuit from source to drain. In either the bipolar embodiment depicted in FIG. 2A or the MOS embodiment depicted in FIG. 2B, the output path 105 from the first output terminal 122 to the second output terminal 124 will occasionally be required to handle a relatively large current for at least a short duration when the power if; first lost or restarted. Accordingly, first transistor 121 should be designed in the preferred embodiment to handle a maximum output current in the range of approximately 2 to 5 A for a duration of at least approximately 5 ms. In either of the embodiments shown in FIGS. 2A and 2B, the first output terminal 122 is connected directly to the Vcc power supply bus 108 while the second output terminal 124 is grounded.

Turning now to FIGS. 3A and 3B, bipolar and MOS alternatives are presented for voltage detector circuit 104. In FIG. 3A, voltage detector circuit 104 is depicted as including an input terminal 130 connected to a first resistor 132 in series with a level shifter circuit 134 and the base terminal 138 of a second transistor 136. Level shifter circuit 134 comprises one or more diodes in series. If a sufficient forward bias is applied across level shifter circuit 134, the circuit replicates a voltage source in that a change in voltage across the circuit is encountered and the voltage drop is, to a first order of magnitude, independent of the current. Emitter terminal 142 of second transistor 136 is grounded and collector terminal 140 is connected to output terminal 113 of voltage detector 104. Output terminal 113 of voltage detector circuit 104 is connected to input terminal 103 of variable impedance circuit 102. Voltage detector circuit 104 as shown in FIG. 3A is designed to detect a relatively slight decrease in the Vcc voltage by biasing the base-emitter junction of second transistor 136 to a "just on" condition. More specifically, once a minimum specified value for Vcc is established, an appropriate number of diodes for use in the level shifter circuit 134 can be determined. With each diode adding approximately a 0.6 V forward bias voltage, it will be appreciated that node 139 must be maintained at a potential of approximately 0.6 (N+1) V (where N equals the number of diodes in level shifter circuit 134) to forward bias the base-emitter junction of second transistor 136. By appropriate selection of the value N, the minimum voltage on node 139 required to turn on transistor 136 can be manipulated. This minimum node voltage is indicative of the sensitivity of the circuit 100. If a larger number of diodes is selected, the critical voltage at node 139 will increase and circuit 100 will be more sensitive to drops in the Vcc bus signal. In one embodiment for example, a nominal 5 V signal is provided to Vcc bus 108 and level shifter circuit 134 is comprised of 5 diodes. The voltage required from emitter terminal 142 to node 139 to maintain the output path of transistor 136 in a low impedance state is approximately 3.6 V (based on a 0.6 V nominal value of the forward bias junction voltage for each of the 5 diodes as well as for the forward biased base-emitter junction of second transistor 136). As long as the Vcc signal exceeds approximately 3.6 V, second transistor 136 is in an "on" condition and, assuming the input circuit is appropriately designed (i.e., that an appropriate value is chosen for first resistor 132), the base current is sufficient to drive second transistor 136 into a saturation condition in which the collector-emitter voltage is approximately 0.2 V. In an embodiment in which the nominal value of Vcc is 5 V and level shifter circuit 134 includes 5 diodes, an appropriate value of first resistor 132 necessary to ensure that second transistor 136 is saturated and the collector voltage is approximately 0.2V is preferably in the range of approximately 200 to 600Ω. The collector voltage produced by second transistor 136 is connected to output terminal 113 of voltage detector circuit 104 and input terminal 103 of variable impedance circuit 102 where it prevents the base-emitter junction of first transistor 121 from becoming forward biased and, therefore, maintains output path 105 in a high impedance condition. If the Vcc voltage drops sufficiently such that the voltage of node 139 drops below 3.6 V, second transistor 136 will shut off and the collector terminal 140 of second transistor 136 will be effectively disconnected from emitter terminal 142 thereby permitting the input terminal 103 of variable impedance circuit 102 to forward bias the base-emitter junction of first transistor 121 and creating a low impedance condition on output path 105 between Vcc bus 110 and ground bus 108. The sensitivity of the voltage detector circuit is controlled by adjusting the number N of diodes in level shifter circuit 134. An increase in N results in a voltage detector circuit 104 that shuts off second transistor 136 with a smaller drop in the voltage on Vcc bus 108, whereas a decrease in N results in circuit more tolerant of variations in the Vcc supply voltage. Because many systems are specified with a power supply figure that is permitted to vary by as much as 10%, the sensitivity of the voltage detector circuit 104 is preferably arranged to tolerate variation of Vcc voltage of at least 10% and, more preferably, in the range of approximately 15 to 25%. Any variation of Vcc exceeding these generous limits almost certainly indicates a temporary loss of power or line disturbance and should result in the operation of rapid discharge circuit 100 presented herein.

Turning now to FIG. 3B, an alternative embodiment of voltage detector circuit 104 is presented in which the second transistor 136 is implemented as a MOS transistor and the level shifting circuit 134 of FIG. 3A is replaced by a voltage divider circuit 145. Voltage divider circuit 145 includes a first resistor 144 connected between input terminal 130 (which is configured to be connected to Vcc bus 108), and a gate terminal 138 of second transistor 136. In addition, a divider resistor 146 is connected between gate terminal 138 and ground bus 110. It will be appreciated that the impedance from drain terminal 140 to source terminal 142 of second transistor 136 is controlled by the voltage applied to gate terminal 138. In turn, the gate voltage is manipulated by adjusting the ratio of divider resistor 146 and first resistor 148. In a preferred embodiment, in which second transistor 136 is configured as an n-channel enhancement device, the voltage required at gate terminal 138 to form a low impedance channel between drain terminal 140 and source terminal 142 is in the range of approximately 0.7 volts. Any gate voltage less than this threshold voltage will be insufficient to create a channel from drain 140 to source 142 resulting in a drain terminal 140 that is essentially floating. Any gate voltage greater than or equal to this threshold voltage will turn on second transistor 136 and, if the circuit connected to drain terminal 140 is designed appropriately, permit sufficient current to flow from drain terminal 140 to source terminal 142 to drive the voltage of drain terminal 140 to less than approximately 0.2 V. Thus, if the drain terminal 140 serves as the output terminal 113 of the voltage detector circuit 104 presented in FIG. 3B, the input terminal 103 of variable impedance circuit 102 is controlled in a fashion analogous to the control of variable impedance 102 discussed above with respect to FIG. 3A. The values of first resistor 144 (R1) and divider resistor 146 (Rd) are selected such that Rd/(Rd+R1)*Vccmin is approximately equal to the threshold voltage, Vt, of second transistor 136 where Vccmin is the minimum specified voltage permitted on Vcc bus 108 before active discharge circuit 100 is enabled. As an example in which the nominal Vcc is 5V, the minimum specified voltage permitted on Vcc bus 108 is 3.5V, and, the threshold voltage of second transistor 136 is 0.7V, the ratio of Rd/(Rd+R1)=0.7/3.5=1/5 and Rd=1/4 R1. Using these resistor values, the output impedance of second transistor will remain low as long as the voltage on Vcc bus 108 remains above 3.5 V. A drop below 3.5 voltage will produce a sub-threshold voltage at gate terminal 138 thereby sending the source/drain path into a high impedance condition (and triggering first transistor 121 into a low impedance condition to rapidly discharge the system). It will be appreciated that the circuits presented in FIGS. 3A and 3B are but examples of appropriate voltage detector circuits 104.

Turning now to FIG. 4, a preferred embodiment of time delay circuit 106 is presented. Conceptually, time delay circuit 106 is designed to meet two objectives. First, during a power outage condition, time delay circuit 106 is designed to provide a source of sufficient current or voltage (depending upon the embodiment of variable impedance circuit 102 selected) to drive first transistor 121 into a low impedance condition. Second, when Vcc bus 108 is powered on and the voltage is ramping from 0V to its full nominal Vcc value, time delay circuit 106 prevents first transistor 121 from turning on until the voltage detector circuit 104 is able to assume control of the variable impedance circuit 102. In the preferred embodiment, time delay circuit 106 includes a second resistor 152 connected between an input terminal 151 of time delay circuit and a delay node 153. Input terminal 151 of time delay circuit is typically connected to input terminal 107 (shown in FIG. 1) of time delay circuit 106, which is typically configured to be connected to Vcc bus 108. A third resistor 156 is connected between delay node 153 and an output terminal 158, which is typically connected to output terminal 109 of time delay circuit 106 and input terminal 103 of variable impedance circuit 102. A delay capacitor 154 is coupled between delay node 153 and ground. When Vcc is at or near its nominal value, voltage detector circuit 104 maintains variable output circuit 102 in a high output impedance condition as described previously. During this time, delay capacitor 154 is charged and delay node 153 maintained at an initial voltage determined by the values of second and third resistors 152 and 156 respectively. If power is subsequently lost, the output terminal 113 of voltage detector circuit 104 will release control of input terminal 103 of variable impedance circuit 102 as the output impedance of second transistor 136 assumes a high condition. (For purposes of this disclosures, a low impedance condition refers to an impedance of less than approximately 100Ω and a high impedance condition refers to an impedance of greater than approximately 10 KΩ). Thus, in the absence of time delay circuit 106, input terminal 103 of variable impedance circuit 102 would be essentially floating. Because, however, the charge stored in delay capacitor 154 cannot be instantaneously dissipated, delay circuit 106 has the potential to drive the variable impedance circuit for a period of time after power is lost. Through appropriate design of the RC time constant associated with delay circuit 106, it is contemplated that delay circuit 106 will be able to maintain first transistor 121 in an "on" state sufficient to drive output path 105 of variable impedance circuit 102 to a low impedance condition for a duration sufficient to discharge essentially all of the charge stored in the system. In a presently preferred embodiment, the time constant of delay circuit 106 (during the discharging of delay capacitor 154 that occurs when power is lost is in excess of approximately 2 ms. In a suitable arrangement, the capacitance of delay capacitor 154 is in the range of approximately 100 to 1000 μF and still more preferably is equal to or greater than approximately 400 μF, while the resistance of second and third transistors 152 and 156 are approximately 50 and 100Ω respectively. During a power reset condition, fully discharged delay capacitor 154 requires a finite duration to charge and, therefore, delay circuit 106 is initially unable to provide a sufficient output voltage or current to drive output path 105 of variable impedance circuit 102 to a low impedance condition. This result is necessary to prevent shunting Vcc bus 108 to ground bus 110 while the system power supply is powering on. If the RC constant of delay circuit 106 is designed appropriately, voltage detector circuit 104 will have assumed control of input terminal 103 of variable impedance circuit 102 before delay node 153 has reached a voltage sufficient to drive variable impedance circuit 102.

Figure 5:
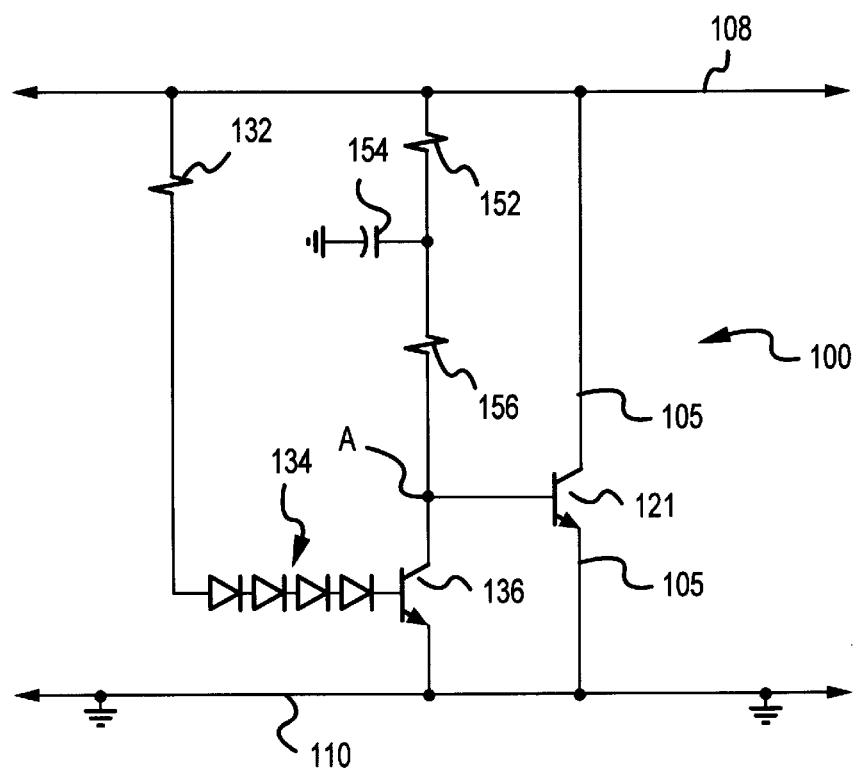
FIG. 5 is a circuit diagram of a presently preferred embodiment of the active discharge circuit according to the present invention.

Turning now to FIG. 5, a presently preferred embodiment of discharge circuit 100 is presented integrating the variable impedance circuit 102, the voltage detector circuit 104, and time delay circuit 106 of FIGS. 2A, 3A, and 4 respectively. It will be appreciated by those knowledgeable in circuit operation that, while the voltage of Vcc bus 108 is maintained above a predetermined minimum specified value, second transistor 136 will be in a saturated condition and the voltage at node "A" of FIG. 5 will be maintained at the Vcesat of second transistor 136 (typically on the order of approximately 0.2V or less). This voltage level is insufficient to turn on first transistor 121 and, therefore, the output path 105 is maintained in a high impedance condition. During this time, delay capacitor 154 becomes fully charged to a value roughly equal to Vcc*R3/(R3+R2) where R2 and R3 are the resistances of second and third transistors 152 and 156 respectively. If power is temporarily lost, voltage detector circuit 104 will detect this and shut off second transistor 136 thereby releasing control of node A. At this time, delay capacitor 154 will begin discharging through third resistor 156 and forcing the base-emitter junction of second transistor 136 into a forward biased condition. While the delay circuit 106 is discharging, output path 105 will be maintained in a low impedance condition providing a vehicle for rapidly discharging the system and quickly returning all system modules and devices to a known power down condition (i.e., 0 volts). In the preferred embodiment, a maximum peak output current specified for first transistor 121 is in excess of 2 A to accommodate the potentially large current that might flow from Vcc bus 108 to ground during system discharging. After the rapid discharge of the system energy, a subsequent power ramp will occur when the power is reset. During the initial stages of the power ramp, delay capacitor 154 will contain insufficient charge to forward bias the base-emitter junction of first transistor 121 and output path 105 will be maintained in the required high impedance condition necessary during the power ramp. Before delay capacitor 154 obtains sufficient charge (and corresponding voltage) to drive first transistor 121, voltage detector circuit 104 will assume control of node A thereby preventing any subsequent turn on of first transistor 121 unless and until a subsequent power drop is experienced.

Figure 6:
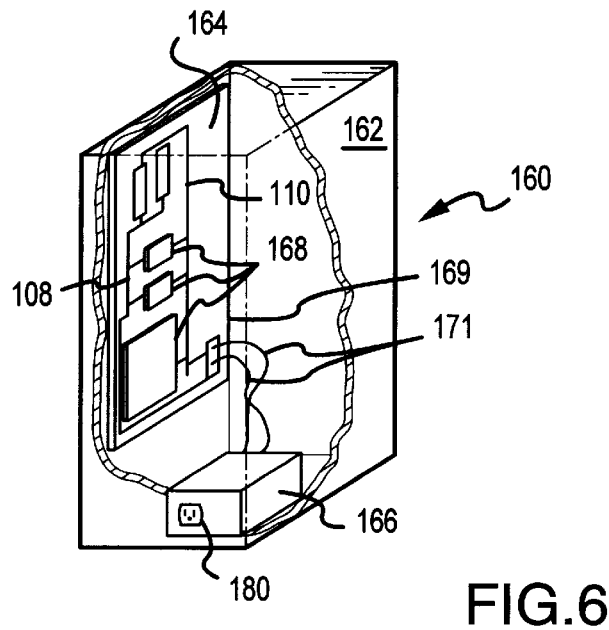
FIG. 6 is a cut away view of a computer system including the active discharge circuit of the present invention.
Figure 7:
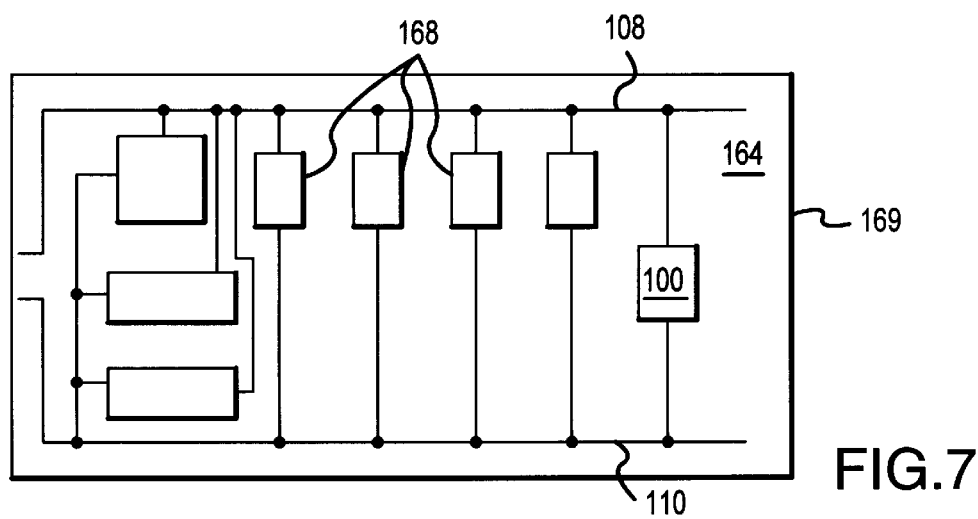
FIG. 7 is a simplified block diagram of a mother board including the active discharge circuit of the present invention.
Figure 8:
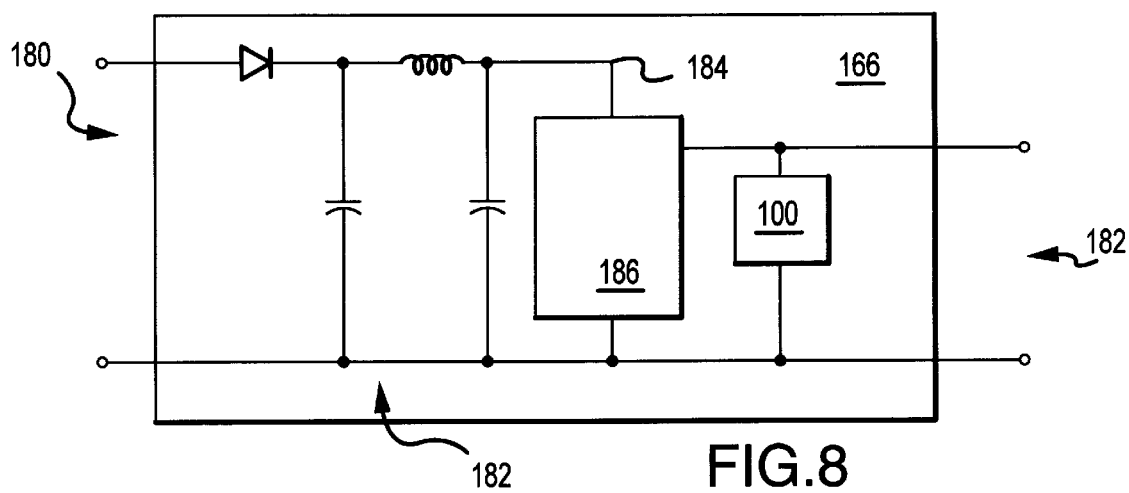
FIG. 8 is a simplified diagram of a power supply including the active discharge circuit of the present invention.

Turning now to FIG. 6, a simplified cut away diagram of a computer system 160 according to the present invention is presented. Computer system 160 includes a chassis 162 including an interior surface to which a printed circuit card 164 and a power supply 166 are attached. Printed circuit card 164 includes a plurality of integrated circuits 168 connected to a printed circuit board 169. The motherboard of a microprocessor based computer system is a suitable example of printed circuit card 164. Printed circuit card 164 further includes a Vcc bus 108 and a ground bus 110 to which each of the integrated circuit devices 168 is connected. Power supply 166 includes an input port 180 configured to receive an externally supplied line voltage such as the 120V AC signal produced by most electrical outlets in the United States and is further configured to deliver a ground signal and a Vcc signal at an output port 182 (not shown in FIG. 6) of the supply. The Vcc and ground signals produced by power supply 166 are suitably routed to printed circuit card 164 via conductors 171 where the they are applied to Vcc bus 108 and ground bus 110 respectively. Computer system 160 further includes active discharge circuit 100 described previously. Turning to FIGS. 7 and 8, alternative implementations of active discharge circuit 100 within computer system 160 are presented. In FIG. 7, active discharge circuit is located on printed circuit card 164 and coupled between Vcc bus 108 and ground bus 110. Those familiar with the design of microprocessor based computers will appreciate that multiple printed circuit cards such as circuit card 168 are present within chassis 162 of a typical computer system 160. In an embodiment of system 160 in which discharge circuit 100 is external to power supply 166, the printed circuit card 168 into which active circuit 100 is fabricated is preferably the computer system mother board. In an alternative design configuration shown in FIG. 8, active discharge circuit 100 is located within power supply 166. In the simplified diagram presented in FIG. 8, power supply 166 is shown as including an input port 180 adapted to be receive an externally supplied line signal and coupled to passive filtering circuit 182 designed to produced an unregulated DC voltage, which is then supplied to an active filter and regulation circuit indicated in FIG. 8 by block 186. The circuitry of block 186 is designed to further stabilize the DC voltage supplied by passive circuitry 182 and to step the nominal value of the DC voltage produced by passive circuitry 182 down to levels compatible with integrated circuits 168 of computer system 160. In one embodiment useful in a large installed base of digital integrated circuits, the Vcc signal produced by power supply 166 has a nominal value of 5V. In an alternative embodiment desirable in a growing number of high performance, low power consumption systems, the nominal value of the Vcc signal is 3.3V. It should be appreciated however, that the other embodiments are readily achievable to produce a Vcc signal with a nominal value other than the values specified in the various embodiments described herein. The output of circuitry 186 (i.e., the Vcc signal and the ground bus) is coupled across active discharge circuit 100 and routed to output port 182, which is designed to be coupled to a power supply bus such as Vcc bus 108 and a ground bus such as ground bus 110 of computer system 160.

It will be apparent to those skilled in the art having the benefit of this disclosure that the present invention contemplates a circuit for improving system reliability by insuring rapid dissipation of stored charge in a system when a temporary power outage or line disturbance is encountered. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. An active circuit for rapidly discharging stored energy in a capacitive system, said circuit comprising:
   a variable impedance circuit including a variable impedance output path configured to be connected between a Vcc bus of said capacitive system and ground;
   a voltage detector circuit including an input coupled to said Vcc bus and an output connected to an input of said variable impedance circuit, wherein said voltage detector circuit is configured to maintain said variable impedance output path in a high impedance condition while the voltage of said Vcc bus remains above a predetermined minimum value; and
   a time delay circuit coupled to said input of said variable impedance circuit and configured to maintain said variable impedance output path in a low impedance condition for a duration after the voltage of said Vcc bus drops below said predetermined minimum.

2. The circuit of claim 1, wherein said variable impedance circuit comprises a first transistor including an input terminal and first and second output terminals, wherein said input terminal of said first transistor is connected to said input of said variable impedance circuit, and further wherein said first and second output terminals of said first transistor are connected to said Vcc bus and ground respectively such that said variable impedance output path comprises a path between said first terminal and said second output terminals.

3. The circuit of claim 2, wherein said first transistor comprises a bipolar transistor and further wherein said input terminal comprises a base terminal of said first transistor and said first and second output terminals comprise a collector and emitter terminal, respectively, of said first transistor.

4. The circuit of claim 3, wherein said first transistor comprises an npn bipolar transistor wherein said variable impedance output path is maintained in said high impedance condition unless a base-emitter junction of said transistor is forward biased.

5. The circuit of claim 4, wherein said output of said voltage detector circuit prevents said base-emitter junction from becoming forward biased while the voltage of said Vcc bus remains above said predetermined minimum value.

6. The circuit of claim 1, wherein said voltage detector circuit comprises a second transistor and a level shifting circuit, and further wherein said level shifting circuit is tied to said Vcc bus and connected in series between said Vcc bus and an input terminal of said second transistor.

7. The circuit of claim 6, wherein said second transistor comprises a bipolar transistor and further wherein a base terminal of said second transistor comprises said input terminal of said second transistor and a collector terminal comprises said output of said voltage detector circuit.

8. The circuit of claim 7, wherein said level shifting circuit comprises a first resistor tied to said Vcc bus and in series with a plurality of diodes.

9. The circuit of claim 6, wherein said second transistor comprises a MOS transistor and wherein a gate terminal of said second transistor comprises said input terminal of said second transistor.

10. The circuit of claim 9, wherein said level shifting circuit comprises a first resistor connected between said Vcc bus and said input terminal of said level shifting circuit and a voltage divider resistor connected between said input terminal of said level shifting circuit and ground.

11. The circuit of claim 1, wherein said time delay circuit comprises second and third resistors and a capacitor, wherein said second resistor is connected between said Vcc bus and a delay node of said time delay circuit, said third resistor is connected between said delay node and said input of said variable impedance circuit, and said capacitor is connected between said delay node and ground.

12. The circuit of claim 11, wherein a time constant associated with discharging said capacitor is in excess of approximately 2 ms.

13. The circuit of claim 12, wherein the capacitance of said capacitor is in the range of approximately 100 to 1000 $\mu F$.

14. A computer system comprising:
   a chassis;
   a power supply unit mounted to said chassis, said power supply unit including an input configured to receive a line voltage and an output configured to produce a Vcc signal when said line voltage is present at said power supply unit input;
   a printed circuit card including a plurality of integrated circuits connected to a printed circuit board, a Vcc bus to which each of said integrated circuits is connected wherein said Vcc bus is configured to receive said Vcc signal produced by said power supply unit; and
   an active discharge circuit comprising:
      a variable impedance circuit including a variable impedance output path wherein said output path is configured to be connected between said Vcc bus and ground;
      a voltage detector circuit including an input coupled to said Vcc bus and an output connected to an input of said variable impedance circuit, wherein said voltage detector circuit is configured to maintain said variable impedance output path in a high impedance condition while said Vcc bus remains above a predetermined minimum voltage; and
      a stored energy circuit coupled to said input of said variable impedance circuit and configured to maintain said variable impedance output path in a low impedance condition for a duration after said Vcc bus drops below said predetermined minimum voltage.

15. The computer system of claim 14, wherein said printed circuit card comprises a mother board including a central processing unit.

16. The computer system of claim 14, wherein said active discharge circuit is integrated within said power supply unit.

17. The computer system of claim 14, wherein said active discharge circuit is attached to said mother board.

18. A power supply unit comprising:
   an input port configured to receive an externally supplied line voltage;

an output port configured to be coupled to a Vcc bus of a computer system, wherein said power supply unit is configured to produce a Vcc signal at said output port when said line voltage is present at said input port; and an active discharge circuit comprising:
- a variable impedance circuit including a variable impedance output path coupled across said output port;
- a voltage detector circuit including an input configured to receive said Vcc signal and an output connected to an input of said variable impedance circuit, wherein said voltage detector circuit is configured to maintain said variable impedance output path in a high impedance condition while said Vcc signal remains above a predetermined minimum voltage; and
- a stored energy circuit coupled to said input of said variable impedance circuit and configured to maintain said variable impedance output path in a low impedance condition for a duration after said Vcc signal drops below said predetermined minimum voltage.

19. The power supply of claim 18, wherein said power supply is configured to receive a 120V AC signal at said input port and further wherein said Vcc signal comprises a DC signal wherein a nominal value of said Vcc signal is in the range of approximately 5 volt.

20. The power supply of claim 18, wherein said power supply is configured to receive a 120V AC signal at said input port and further wherein said Vcc signal comprises a DC signal wherein a nominal value of said Vcc signal is in the range of approximately 3.3 volts.

* * * * *